US008739300B2

(12) United States Patent  
Krajna et al.

(10) Patent No.: US 8,739,300 B2  
(45) Date of Patent: May 27, 2014

(54) SYSTEM AND METHOD FOR TRANSMISSION OF FILES WITHIN A SECURED NETWORK

(75) Inventors: Thomas G. Krajna, Huntsville, AL (US); Duane L. Violett, Madison, AL (US)

(73) Assignee: Intergraph Corporation, Madison, AL (US)

( * ) Notice: Subject to any disclaimer, the term of this patent is extended or adjusted under 35 U.S.C. 154(b) by 368 days.

(21) Appl. No.: 12/982,232

(22) Filed: Dec. 30, 2010

(65) Prior Publication Data

US 2011/0162050 A1  Jun. 30, 2011

Related U.S. Application Data

(60) Provisional application No. 61/291,109, filed on Dec. 30, 2009.

(51) Int. Cl.  
*G06F 21/24* (2006.01)

(52) U.S. Cl.  
USPC .......... 726/27; 726/1; 726/2; 726/26; 726/28; 726/29; 726/30; 713/189; 713/193

(58) Field of Classification Search  
None  
See application file for complete search history.

(56) References Cited

U.S. PATENT DOCUMENTS

| 5,751,719 | A | 5/1998 | Chen et al. ............... 370/473 |
| 6,396,805 | B2 | 5/2002 | Romrell .................. 370/216 |
| 6,584,466 | B1 | 6/2003 | Serbinis et al. ............ 707/10 |
| 7,406,596 | B2 | 7/2008 | Tararukhina et al. ....... 713/165 |
| 2003/0028664 | A1 | 2/2003 | Tan et al. ................. 709/237 |
| 2005/0144478 | A1* | 6/2005 | Yamanaka et al. ........... 713/201 |
| 2005/0149340 | A1* | 7/2005 | Murakami et al. ............. 705/1 |
| 2007/0289025 | A1* | 12/2007 | Tanaka et al. ............... 726/28 |
| 2008/0021936 | A1* | 1/2008 | Reynolds ................. 707/203 |
| 2008/0155614 | A1 | 6/2008 | Cooper et al. ............... 725/91 |

(Continued)

FOREIGN PATENT DOCUMENTS

KR  10-0873788  12/2008  ........... H04L 12/28

OTHER PUBLICATIONS

Authorized Officer: Uhm, In Kwon, Notification of Transmittal of the International Search Report and the Written Opinion of the International Searching Authority, or the Declaration, PCT/US2010/062535, Oct. 14, 2011, 9 pages.

(Continued)

*Primary Examiner* — Jung Kim  
*Assistant Examiner* — Adrian Stoica  
(74) *Attorney, Agent, or Firm* — Sunstein Kann Murphy & Timbers LLP (57) ABSTRACT

A system and method of distributing a file maintained on a first device located at the top tier of a secured network having at least a second device at a lower tier, without needing to change security parameters of the secured network, is disclosed. Network administrators may access the top tier of the network, may add files into the system, and may generate a file privilege file. The file privilege file can include configuration information for a computer on a tier and may include information about files accessible to a computer on a specific tier. The network propagates the file privilege file from the first device through intermediate devices and onto the second device. The second device may then receive a file authorized from the first device via a connection in the secured network. The second device may also propagate files up to the first device.

19 Claims, 4 Drawing Sheets

(56) References Cited

U.S. PATENT DOCUMENTS

| | | | |
|---|---|---|---|
| 2008/0222044 A1* | 9/2008 | Gottlieb et al. | 705/59 |
| 2008/0256563 A1* | 10/2008 | Han | 719/329 |
| 2008/0256646 A1* | 10/2008 | Strom et al. | 726/29 |
| 2008/0271165 A1* | 10/2008 | Schnell et al. | 726/30 |
| 2008/0288784 A1* | 11/2008 | Lee et al. | 713/189 |
| 2009/0006109 A1* | 1/2009 | Martinez et al. | 705/1 |
| 2009/0043866 A1* | 2/2009 | Lee et al. | 709/217 |
| 2010/0024039 A1* | 1/2010 | Reuzel | 726/26 |
| 2010/0043077 A1* | 2/2010 | Robert | 726/27 |

OTHER PUBLICATIONS

Fukushima, T., et al., "A Wireless Agent for Autonomous File Synchronization in a Mobile Environment," *IEEE*, pp. 415-420, 2005.

* cited by examiner

SYSTEM AND METHOD FOR TRANSMISSION OF FILES WITHIN A SECURED NETWORK

GOVERNMENT RIGHTS

This invention was made with government support under GSA contract GS-35F-0011F. The Government has certain rights.

PRIORITY

The present United States patent application claims Priority from U.S. Provisional Patent Application 61/291,109 filed on Dec. 30, 2009 entitled, "System and Method for Transmission of Files Within a Secured Network", which is incorporated herein by reference in its entirety.

TECHNICAL FIELD

The present invention relates to secured networks, and more particularly to providing updated and revised documents to devices within the secured network without having to change security settings within the network.

BACKGROUND ART

It is known in the prior art to transfer files using a socket-based system. Thus, sockets at a client and at a server are both opened and a connection is established between the client and the server application for bidirectional communication through a particular port. This connection scheme posses problems when either the client device or the server device does not wish to allow access to an unprotected port. Problems also ensue when firewalls are involved. Firewalls generally restrict the transmission of unauthorized data and the establishment of sockets at ports. Thus, socket connections are generally not used in secured Government networks where the government does not want to expose an unprotected port or change its security settings.

In secure networks, and more specifically Government networks, wherein each hop within the network is under the control of a single entity, the addition of an application for transfer of data between computers is difficult because of the Government's desire not to expose a port that could potentially cause a security breech. Thus, the Government does not want to change any security settings.

In the past, due to the Government's desire to fully lock down their network, in order to update a computer or to change the configuration of a remote computer in the field, a person would have to be dispatched to the location of the computer and the person would have to manually reconfigure the computer or manually add an updated or new file.

Thus, the process of reconfiguration or updating is extremely time-consuming and also expensive.

SUMMARY OF THE INVENTION

A system and method of distributing a file maintained on a first device in a secured network having at least the first and a second device is disclosed. Embodiments of the present invention provide for file synchronization within a secured network without requiring any alteration to the security of the secured network by opening up ports. Each device is located on a tier of the network. The top tier of the network that includes the first device is accessible to network administrators. Network administrators may add files into the system and the network administrators may generate a file privilege file. The file privilege file can include configuration information for a computer on a tier and may also include information about which files the computer at a specific tier has access to. The network will then propagate the file privilege file down from the first device through any intermediate devices and then onto the second device. The file privilege file may include a listing of all of the files that the second device is entitled to have access. In other embodiments, the file privilege file may contain security information and a listing of all files that are distributed within the secured network. The file privilege file may be changed by a network administrator and the file privilege file is preferably generated and changed on the first device at the top tier of the network. In addition, the file privilege file may contain a file hierarchy in which the files are stored at each tier of the network and may further include information about the propagation path for the file. The propagation path indicates on which tiers the file exists and can be accessed by a lower tier. In other embodiments, the file hierarchy is propagated through the network and a copy of the file hierarchy is stored at each tier in the network.

In alternative embodiments of the invention, the file privilege file may originate on the second device and may be propagated through any intermediate devices to the top device. In such a configuration, the second device would be informing the first device of the files that are presently located on the second device. In this system and methodology, the first tier or device has administrative privileges. Thus, the first device can change the file privilege file and the file privilege file can be propagated to each device within a path to the second device or to each device within the network. The second device does not have access to make changes to the file privilege file. Additionally, the file privilege file may be sent upstream and downstream on a regular basis or when updates occur. In embodiments of the invention, the file privilege file may contain security information. For example, the file privilege file may include usernames and passwords, public and private keys, or other security codes to prevent unauthorized distribution of files and unauthorized access to the file privilege file.

Once the file privilege file has filtered through the secured network, the second device may receive a copy of any file authorized from the first device via a connection in the secured network.

The file at the first device may be modified by an administrator and the file may be associated with update information. A request may be made by a client module on the intermediate device using a stateless protocol via a connection in the secured network to a server module on the first device for transmission of the modified file if the update information of the file meets a criteria. The criteria for the update information may simply be an editing date, a version number, or some other indicia of a change to the file. The modified file and the update information may then be transferred from the first device via the server module on the first device to the intermediate device using a stateless protocol via a connection in the secured network in response to the criteria being met. For example, the modified file has a date that is later than the date associated with the file on the intermediate device. A request to a server module on the intermediate device for transmission of the modified file if the update information of the file meets a criteria may be made by a client module on the second device using a stateless protocol via a connection in the secured network.

In certain embodiments, the client device polls the server at a known address for a metadata file. The metadata file represents each file that is present on the server. The client device pulls the metadata file and compares the metadata file to the files that are present on the client device. If the server module has a file for which the client device should have access, the client device will pull the file from the server.

In embodiments of the invention, the modified file and update information from the intermediate device may be transferred via the server module on the intermediate device to the second device using a stateless protocol via a connection in the secured network in response to the criteria being met. The modified file may then replace the original file and may be accessible by a user of the second device. Similarly, the updated information may be replaced.

In certain embodiments, the file is transferred between devices using an unsecured application layer protocol and a secured transport layer protocol.

The client module may interact with a server module on another tier by first validating that the client device has the proper security clearance to download files from the server. This may occur using passwords or secure keys or other well known authentication mechanisms.

In an alternative embodiment of the invention, a file privilege file at the second device is propagated to the first device through the intermediate device wherein the file privilege file includes hop data indicative of each hop taken within the secured network. At the first device, the file privilege file is updated so as to authorize the second device to receive a new file or updated file. In response to a client application request and based on the hop data, the file privilege file for the second device is received and stored on the intermediate device along with the hop data. A request for the updated file privilege file is received from the second device at the intermediate device based upon the hop data. In response to the request, the updated file privilege file is sent to the second device. Subsequent to receiving the updated configuration file, the second device requests the new file from the intermediate device using a client application.

The client module running on the client device may utilize HTTP parameters to keep track of the received data from the server and the client module may also keep track of the data that is transmitted from the client device to the server. The server module on the server device is configured to keep track of received data. The server module may keep track of an arbitrary chunk size and maintain a log of the data chunks that are received along with a chunk number for ordering of the data.

The client and server modules may be embodied as a computer program product that a non-transient computer readable medium with computer code thereon. The client module provides a mechanism for updating a file between a first network device and a second network device within a secured network without needing to change security parameters of the secured network. The computer program product for the client module includes computer code for uploading the file from memory associated with the first network device to a server component on the second network device. The computer program product for the client module also includes computer code for requesting from a web server on the second network device using a stateless protocol a file privilege file that contains at least a list of files accessible by the first network device. Additionally, the computer program product for the client module includes computer code for downloading an updated version of the file from the web server on the second device if the file has been modified by comparing the file stored in memory with the list of files from the file privilege file.

The computer program product for the client module may also contain computer code for assigning a unique identifier for the first network device and computer code for providing the unique identifier for the first network device with the file when uploading the file from memory to the server component on the second network device. Additionally, the unique identifier is initially assigned to the first network device and provided to the second network device prior to the file privilege file being requested from the web server on the second network device and the file privilege file references the first network device by its unique identifier.

The computer program product for the client module may further include computer code for initiating an upload of the file from memory of the first network device if the file has been modified to the server component on the second network device wherein the initiation of the upload occurs at a regularly scheduled time. The computer code for initiating an upload further comprises sending a specified folder path to the second network device that includes a unique identifier for the first network device. In embodiments of the invention, the file privilege file contains a folder path indicative at least each network device that has received or transferred the file.

The server module may be embodied as a computer program product. The computer program product including a non-transient computer-readable medium having computer code thereon. The server module provides for the updating of a file between a first network device and a second network device within a secured network without needing to change security parameters of the secured network. The computer program product for the server module includes computer code for receiving at a first device security data from a second device requesting access to files on the first device. Additionally, it includes computer code for confirming that the second device is authorized to access files on the first device. The server module also includes computer code for providing a listing of available files on the second device. The listing of available files is provided in the form of a file privilege file which contains information regarding the available files on various tiers of the secured network. In response to providing a listing of available files the server module may include computer code for receiving a request for transfer of at least one of the files in the listing of available files. The server module may then allow the authorized first device to download one or more of the files from the listing of available files. The listing of available files may be a subset of files present on the second device. For example, the listing of available files may be files that the first device is specifically authorized to have access to.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In the present detailed description and claims, the terms "client" and "server" are used to refer to the transmission of data from a requesting "client" device that is served a file or data by a "server" device. As shown in the figures of the present application and as described below in the examples, computer-related modules are designated to show the direction of the transmission of data (i.e. from a server device to a requesting client device). Preferably, the client device knows the address of the server device and communicates using a stateless protocol such as HTTP/HTTPS. In contrast, the server does not need to know the address of the client device that requests information from the server and also pulls the information from the server. The client device may also transfer data to the server device. Specifically, the client device is likely to transfer a file privilege file for the client device to the server device on the next highest tier. Additionally, a client module on the client device may transfer one or more files to a server module at a next highest tier. As used in the detailed description and claims the term "module" shall refer to computer program code which may be stored on a computer readable medium, such as a disk or memory. Module may also refer to hardware implementations of the client and server functionality, wherein the functionality may be embodied in a computer circuit such as an application specific integrated circuit ("ASIC") or a module may be a combination of hardware and software. If the module represents hardware and software, either the hardware, the software or both will be specifically designed to perform the functionality of either a client or server as described below. As used herein, the term "requesting" may refer to a client application querying a server application for a file on the server wherein the server application responds to the client query. Additionally, the term "requesting" may refer to a client application pulling a file from a server if the server is configured to be a passive device. For example, in embodiments of the presently described invention in which the network operates using a stateless protocol, the server device does not need to know the address of the client device and therefore, the client device contacts the server device and may pull a desired file from the server.

Figure 1:
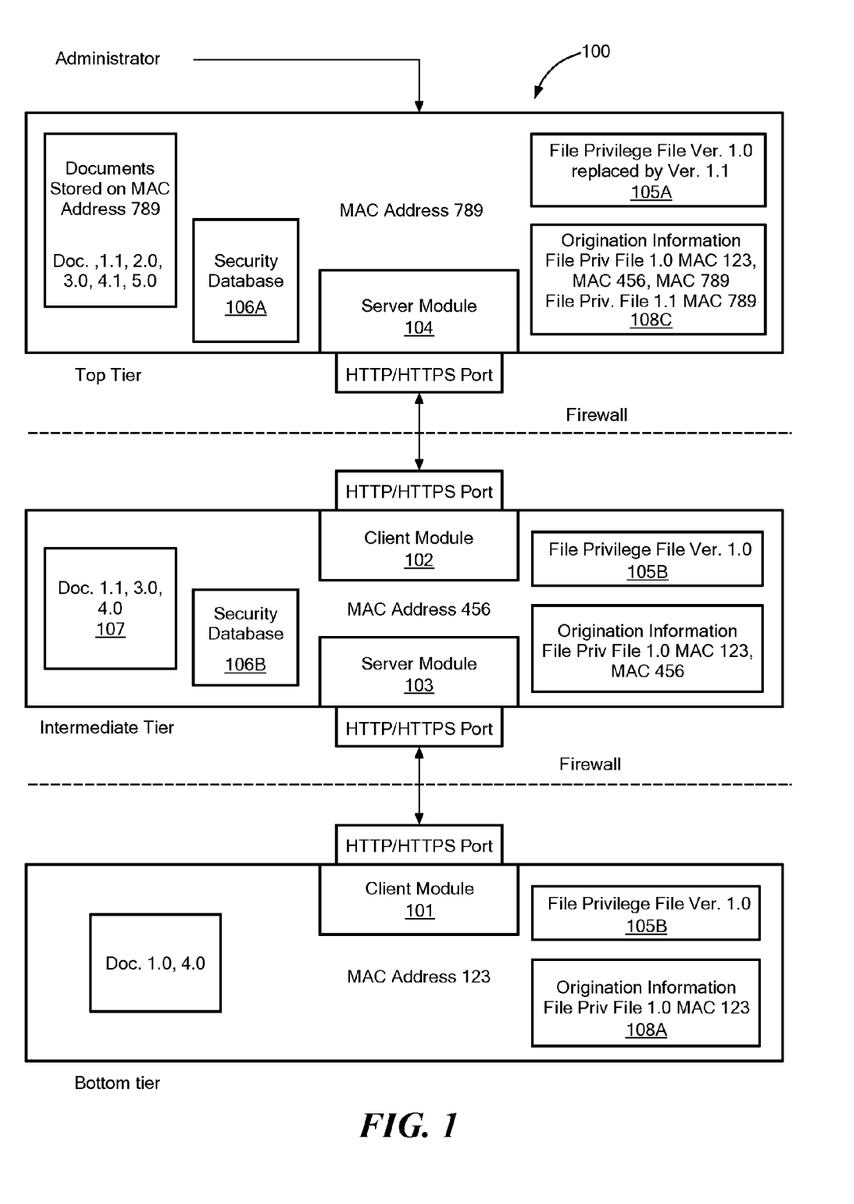
FIG. 1 shows a multiple tiered secured network wherein a file privilege file is sent from the bottom tier to the top tier through web services.

In a secured network as shown in FIG. 1 that is under the control of a single entity wherein the entity does not wish to change any security settings including opening up of ports to access by other entities within the network. The addition of client and server modules (101, 102, and 103, 104) within this network 100 at each tier provide a mechanism for propagating a file privilege file 105. The file privilege file 105 at least identifies whether a device at a specific tier has a security setting to have access to a file. The file privilege file 105 may be either a global file privilege file that originates at the top tier and propagates down to the bottom tiers or the file privilege file may be an individual file privilege file that originates at the bottom tier and propagates up from the bottom tier to the top tier. The file privilege file provides for file synchronization between tiers without requiring a change in security. The file privilege file as with other files located on each tier will on a regularly scheduled basis propagate up to the top tier where the files may be modified by a system administrator. The client and server modules operate using a stateless protocol such as HTTP and HTTPS so that the modules can operate in the presence of firewalls. Identification, data transport, and hierarchical organization of the files across tiers are all managed by the client and server software modules. The file privilege file may also contain configuration information for one or more computer devices within the network. Both the client module and the server module maintain a log of what is transmitted and what is received. Thus, if there is a disconnect i.e. a temporary failure in the network communications between a client and server module on different tiers, the client and server modules can resume transmission of any data file without the need to retransmit the entire data file. For example, the server module when receiving data/file from a client module will store and save indicia of the data size received. This may be stored to a temporary memory storage location at the server. The server may also maintain the total size of the file, the name of the file, the type of the file and other related information about the file.

In one embodiment, the administrator of the file privilege file at the top tier updates the global file privilege file and the file privilege file is passed between tiers wherein a client module on an intermediate tier will request an updated version of the file privilege file and a server module on the top tier will provide an updated file privilege file to the client module on the intermediate tier. The server can operate in a substantially passive function in which the client queries the server for available files, retrieves the updated list of available files from the server e.g. the file privilege file, and pulls any updated and or new files. The file privilege file reaches the bottom tier computer devices and is thus distributed throughout the secure network.

In other embodiments, each device that is within the network is initially configured with an individual file privilege file. In such a network configuration, when a device is connected to the network, the computer device registers itself with the closest tier. For example, a bottom tier computer device will register itself with an intermediate tier device. The file privilege file on the bottom tier computer device is then promulgated up to the top tier as the result of a request originating at the intermediate tier.

For file transfers to be correctly associated with originating device (e.g. the bottom tier device) a unique identifier needs to be assigned. In a preferred embodiment, the unique identifier is the MAC address of the network card that is associated with the tier. Thus, the client module detects each network card MAC address and adds it to a list. As files are moved between tiers the MAC address is transmitted with the file and the MAC address for the receiving tier is added to the list. The unique identifier may also be referred to as hop data.

Both the client module and the server module (101, 102 and 103, 104 as shown in FIG. 1) contain security features. The client module is designed such that it may only send files (e.g. both file privilege files and documents) up to a server module at a next higher tier and can not send files directly without receiving a request from a higher tier level. The client module may make requests to the server for downloading of files or updating of files for which the client device has security clearance to receive. The server module is configured to have a security database 106 that identifies the security clearance of the client device as identified by its network card MAC address. This security database can be built based upon the file privilege file.

Thus, when a request for an updated file is sent from a client application to a server application on a higher tier, the server application will first identify the client device based upon the MAC address that accompanies its request. The server application will then access a database 106 to see if the client device has permission to receive updates for the requested file. If the client device does have permission, the server module, will then look to see if it contains the requested file. For example, the client device 101 may send a request indicating that the client device presently has Doc1.0 along with its MAC address 123, see FIG. 1. The server application 103 will confirm that the client device 101 with MAC address 123 has security clearance to receive updates of Doc1.0 by referencing the security database 106B. If there is an update of Doc1.0, for example, Doc1.1 (as shown in the Documents file 107), then the server 103 will transmit Doc1.1 to the client device 101 based upon the MAC address 123 for the client device. The server module may require the client module to present a certificate prior to allowing the server module to make a request for file. In such a configuration, the security database 106B may maintain the public keys for the client modules so that the client module can be authenticated. The keys and passwords may be associated with either a client or server module or may also be associated with a particular user that is attempting to access a file or have a file updated. For example, a user may make a request using a client module on a tier (e.g. the bottom tier as shown in FIG. 1) and that request is passed to the server module. The user may have credentials and the client module itself may have its own security credentials. The users credentials can be independent of the credentials of the client module. Thus, a user may have restricted access to files and making requests for updates to files. As described below and as represented in the Figs. the file synchronization may operate completely autonomously without the need for a user to make a request for an update to a file. However, the system is configured in such a way as to allow users to make requests independent of the autonomous nature of the system.

FIG. 1 shows a multiple tiered secured network 100. wherein configuration information (i.e. the file privilege file) is shown being sent from the bottom tier to the top tier through web services. It should be understood that there may be multiple bottom tier devices and multiple intermediate tier devices and that the present representation is shown in its simplest form for convenience of the reader.

A file privilege file 105B on the bottom tier can be transmitted up to the top tier through client and server modules. The bottom tier client module 101 may transmit the file privilege file 105B on a regularly scheduled basis in response to a request from a web services module 103 on a higher tier. Transmission of the file privilege file from a bottom tier device to the top tier device and back to the bottom tier device in a round-trip transaction confirms that the bottom tier has the most up to date file privilege file. The file privilege file is requested by an intermediate tier and transmitted from the bottom tier using a web service. The web service allows for the file privilege file to be sent to the client module on another tier. The benefit of using a web service is that the web service only uses open ports, does not require that the security settings be changed on any of the tiers, and works through firewalls. The web service may be built using component-based tools such as SOAP and XML and use HTTP and HTTPS protocols. Thus, the file privilege file will be pushed from the bottom tier to the intermediate tier at the request of a client module to a server module. The intermediate module will likewise push the file privilege file from the intermediate tier to the top tier.

In addition to the file privilege file, the MAC address or GUID of each tier through which the file privilege file passed will be provided in an origination file 108A. Thus, an administrator or service on the top tier can confirm the validity of the file privilege file. At the top tier, the administrator can change or replace the file privilege file and the file can make its way back down to the bottom tier. When the file privilege file is modified by the administrator, the client device on the next lowest tier will request the file privilege file. The server module on the top tier will respond to the request from the client device and send the updated file privilege file to the intermediate tier and the intermediate tier will store the file privilege file along with origination information (e.g. the MAC address of the top tier along with the MAC addresses of the bottom and intermediate tiers). The MAC address of the intermediate tier will then be appended. Thus, the MAC addresses will indicate that the file originated at the bottom tier and was sent up to the top tier and is now proceeding back down to the bottom tier.

FIG. 1 shows the updated file privilege file being transferred from the Top Tier back down to the Bottom Tier. For example, assuming that the bottom tier has a MAC address of 123 the intermediate tier has a MAC address of 456 and the top tier has a MAC address of 789. The updated file privilege file will be accompanied by a list of MAC addresses MAC 123, MAC 456, MAC 789 indicating the origination information 108C of the original file privilege file 105B. Thus, the origination of the file privilege file version 1.0 can be readily determined as originating from MAC 123. The client device 102 on the intermediate tier will make a request for the file privilege file 105A and will provide the current version number for the file privilege file on the intermediate tier to the server module on the top tier. Since the top tier has an updated file privilege file (Version 1.1 as opposed to Version 1.0 on the Intermediate Tier), the updated file privilege file will be transmitted to the Intermediate Tier. As shown in FIG. 1, the updated file privilege file has not yet been transferred from the Top Tier to the Intermediate Tier. In addition to the updated version 1.1 of the file privilege file, the server at the top tier will also transmit the origination information. The server may transmit either a complete file of all origination information or the server may transmit the updated origination information. In this example, the updated origination information is that file privilege file version 1.1 originated at the top tier having MAC address 789 as shown in 108C The client module 101 on the bottom tier will make a request to the server module 103 on the intermediate tier to check if there is an updated file privilege file. Thus, there would be some criteria provided by the client device 101 on the bottom tier to the intermediate tier. The bottom tier might indicate "please send me any new version of the file privilege file having a version number greater than 1.0." Thus, the intermediate tier server 102 will check the security database 106B and locate the file privilege file version number 105B and compare the version number to the version number received from the client module of the bottom tier. When the versions are out of sync (i.e. bottom tier has version 1.0 and intermediate tier has version 1.1), the server module on the intermediate tier will transmit the updated file privilege file along with the origination information to the client module on the bottom tier.

The file privilege file may be a global file privilege file in which the file privilege file contains all of the privileges for all of the devices on the network. In other embodiments, the file privilege file may be designated for a specific tier, device, or group of devices. In such an embodiment, although the file privilege file may not be used by a tier (e.g. the file privilege file for the bottom tier is not used by the intermediate tier) the file privilege file will be passed through that tier (e.g. intermediate tier) and requested by the client module on the tier (e.g. intermediate tier) from a server module on an upper tier (e.g. to tier). The tier (e.g. intermediate tier) will hold the file privilege file until the lower tier (e.g. bottom tier) requests the file privilege file for the lower tier.

In certain embodiments, the operating system file hierarchy of the computer receiving a file may be used for organization of the file so that the point of origination, the path taken to the administrator, and the version of the document may be maintained in place of a separate origination information file. If a computer (GUID=001122334455) (Global Unique Identifier) receives a file from a remote machine (GUID=66778899AABB) one network hop distant, it would store it in a folder matching the GUID of that remote machine (66778899AABB). If that data is relayed to a higher tier, it is stored in a folder hierarchy that includes both GUIDs (001122334455/66778899AABB). This way, the path back to the most remote device is preserved and can be followed if a file needs to make a full round-trip to that machine. The GUID is generated using an OSF ("Open Software Foundation") specified algorithm that includes the MAC address of the network card as is known to one of ordinary skill in the art.

Additionally, it should be recognized that during propagation of a file privilege file, different tiers may have access to different versions of the file privilege file. Thus, because of the propagation feature, all files are not guaranteed to be synchronized. However, since each client module polls the server module on the next highest tier, the updated file privilege file eventually propagate to the bottom tier and therefore across the entire network in the case of a global file privilege file.

By having the file privilege file propagate up to the top tier and back down, each tier has access to the file privilege files of all devices that are coupled to that tier at a lower level. Thus, as documents are updated at the top tier, each lower tier can determine which documents should be sent down to a bottom tier device. File privilege files may be regularly sent up to the top tier for updates, so that new documents may be made accessible to the bottom tier. For example, the bottom tier may be a computer laptop that is located in the Iraqi desert. The user of the laptop may have recently been equipped with an M60 machine gun. The laptop does not contain any maintenance files about the M60 machine gun. The administrator knows that the bottom tier laptop user has received the M60 machine gun and upon receiving the file privilege file, alters the file privilege file to grant access privileges to the M60 operation and maintenance manual. The updated file privilege file will propagate down to the bottom tier. Thus, upon the next query by the client module on the intermediate tier after the file privilege file has propagated down, the operation and maintenance manual will be downloaded to the intermediate level. After this download, upon the next query by the client module on the bottom tier, the server module on the intermediate tier will download M60 operation and maintenance manual.

For example, Doc. 1.0 has been updated by an administrator to version 1.1. After the updated file privilege file propagates through the network, the intermediate tier will request Doc. 1.1 based upon the information contained within the file privilege file that indicates that the intermediate tier can receive Doc. 1.1. Similarly, the file privilege file may indicate that the bottom tier may receive Doc1.1 and therefore, the client module on the bottom tier will request Doc. 1.1 from the server module on the intermediate tier. If the server module has access to Doc. 1.1 the document will be sent to the client module on the bottom tier. If the server module on the intermediate tier does not have Doc. 1.1, the server module will inform the client module of the bottom tier that no update is yet available. The client module on the bottom tier will then periodically request document 1.1 from the intermediate module. When Doc. 1.1 propagates down to the intermediate tier, the next time that the client module requests Doc. 1.1 the server module on the intermediate tier will transmit the document to the client module on the bottom tier.

The present invention as embodied also provides a mechanism for transmission of the files in an efficient manner without having to connect to the top tier when a network problem occurs. For example, some of the tiers may be connected together through satellite connections that are intermittent. The file transmission process keeps track of the received chunk size. A chunk denotes a predetermined size of data (e.g. 16 bits, 32 bits, 256 bits etc.). Thus, the present embodiment allows for documents to be transmitted between tiers from the point at which the transmission was terminated. The file download process normally requests the entire file. In the event of an error or network dropout, however, the file is requested from the previous point of interruption. This helps minimizing the network bandwidth. The file upload process has a configurable "chunk size" parameter that determines how large a portion of the file is uploaded. These file pieces are sent sequentially until the entire file has been received and reconstituted at the receiving end. In the event a portion of the file does not upload successfully, a second parameter determines the amount by which the chunk size is reduced. By using this type of adaptive upload, the file chunk size is automatically optimized in accordance with the quality of the network connection. Additionally, the file privilege file may contain the total number of chunks of a file. Therefore, the receiving device will know when an entire file has been received. In other embodiments, an end of file is present in the last chunk and the receiver will recognize this end of file parameter.

Figure 2:
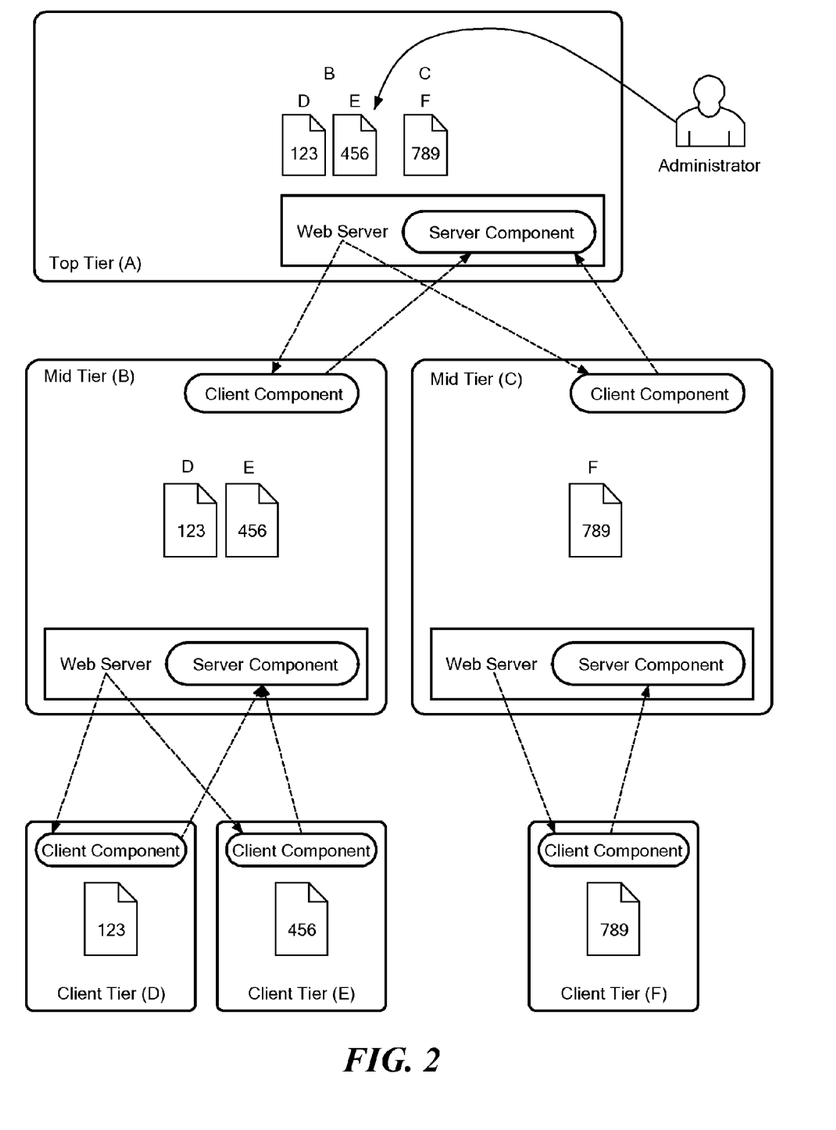
FIG. 2 show another multiple tiered secured network wherein there are multiple intermediate tiers and multiple bottom tiers.

FIG. 2 shows an example of a round trip file transfer from a Client Tier computer (i.e. bottom tier in FIG. 1) located two network hops from a system administrator 200. The Client Module 201 on computer (E) automatically assigns the computer a unique identifier based on the last detected MAC ID of the machine as described above. This occurs when the Client Module 201 runs for the first time or when a new MAC ID is detected. The Client Module 202 on computer (B) automatically assigns the computer a unique identifier based on the last detected MAC ID of the machine. This occurs when the Client Module runs for the first time or when a new MAC ID is detected. As expressed above, this MAC address may be used along with the file structure for maintaining path information regarding the origination and transmission of files at each tier or the information may be stored in a separate origination file. The origination information file is preferably kept separate from the file privilege file on each computer within the secured network. In certain embodiments, this information is included with or placed within the file privilege file and is transmitted between tiers on a regular basis.

The file privilege file may specify the address of the web server(s), encrypted usernames/passwords, certificates to be presented to the server, the polling frequency for the client application to check to see if new versions of files are available, upload/download frequency of files or the file privilege file, and target folders that store the files. Because the connection between web servers (e.g. the client and server modules) is via HTTP which is unsecured, the methodology can use various other security measures in order to secure the data. Username and passwords may be used at both the top tier for the administrator and the bottom tiers for users of the bottom tier computers. Additionally, the transport layer may be secured using a security protocol such as Secure Socket Layer (SSL) or transport layer security wherein certificates may be passed between the various tiers. In order to prevent tampering with the file privilege file, the file privilege file may be transmitted in an encrypted form wherein the client and server module are configured with a corresponding decoding and encoding algorithm respectively. Additionally, the file privilege file can be transmitted with a hash in order to confirm that the encrypted file has not been tampered with during transmission of the file privilege file between tiers.

As expressed above, the storage locations and file structure information (origination information) may be transmitted separately from the file privilege file. This can be done for security reasons, since the file structure changes upon each update so that only the administrator can change the file privilege file. In other embodiments, the administrator would have total control over the files that a tier or specific computer may have access to, but other aspects of the file privilege file could be changed by a non-administrative computer within the secured network. In this type of embodiment, the file transfer structure and the path taken for each file may be included within the file privilege file.

Upon initialization of the system the file privilege file is distributed between the top tier of computer (A) to computers (B) and (C). This is accomplished through the web server 203 on computer (A) wherein the client modules 202, 204 on computers (B) and (C) request the file privilege file using a "download" process. Subsequent to this distribution of the file privilege file and during initialization of the system, the Client Module 201 on computer (E) is configured to talk to the Web Server 205 on computer (B) using a "download" process and is configured to request the file privilege file for both computer (D) and computer (E).

Either during or after the distribution of the file privilege file, the client module 201 on computer (E) interacts with the Server Module 205 on computer (B) using an "upload" process and is configured to include file 456 in that process. The Client Module 202 on computer (B) is configured to interact with the Server Module 203 on computer (A) using an "upload" process and is configured to include all incoming files from computer (D) and computer (E) in that process. Thus, files 123 and 456 are uploaded to the top tier.

The Web Server 203 on computer (A) is configured to point to the incoming data from computer (B) and computer (C). In other embodiments, the files are physically transferred as opposed to a pointer change. This includes the subsets of incoming data from computer (D), computer (E), and computer (F).

Subsequent to the distribution of the file transfer file to all computers within the network and the transfer of the initial files from the client tier to the top tier, file transfers may be executed.

The Client Module 201 on computer (E) automatically initiates the upload process on its regularly scheduled basis and checks if file 456 has already been sent to the Server Module 206 on computer (B). If the file has been sent, the Client 201 Module checks if any modifications have been made to file 456 since its last transfer. This is accomplished by accessing the current file privilege file that resides on computer (B). If the file is new (i.e. a new version) or modified, the Client Module on computer (E) transfers it to the Server Module on computer (B). During the transfer, computer (E) specifies a folder path containing the unique identifier of computer (E).

The Server Module 206 on computer (B) receives incoming file 456 if it is new or modified, and stores it under the unique folder path specified by computer (E).

The Client Module 202 on computer (B) automatically initiates the upload process on its regularly scheduled basis and checks if the files received from computer (D) and computer (E) have already been sent to the Server Module on computer (A). Again the current file privilege file is accessed to ascertain the status of the files. For each such file, if the file has been sent, the Client Module checks if any modifications have been made to it since its last transfer by accessing the current file privilege file that resides on the computer (B). If the file is new or modified, the Client Module 202 on computer (B) transfers it to the Server Module 203 on computer (A). During the transfer, computer (B) specifies a folder path containing the unique identifier of computer (B) which in turn includes the unique identifiers of computer (D) and computer (E).

The Server Module 203 on computer (A) receives the incoming files if they are new or modified and stores them under the unique folder path specified by computer (B) which in turn includes the unique identifiers of computer (D) and computer (E).

The administrator on computer (A) modifies file 456 as necessary.

The Client Module 202 on computer (B) automatically initiates the download process on its regularly scheduled basis and connects to the Web Server on computer (A) to check if any of the files designated for computer (B), computer (D), or computer (E) are new or modified by downloading and checking the file privilege file on computer (A). The Client Module 202 on computer (B) then downloads any new or modified files from the Web Server 203 on computer (A), storing them under the folder path containing the unique identifier of computer (B) which in turn includes the unique identifiers of computer (D) and computer (E).

The Client Module 201 on computer (E) automatically initiates the download process on its regularly scheduled basis and connects to the Web Server 206 on computer (B) to check if any of the files designated for computer (E) are new or modified by downloading the file privilege file from computer (B). The Client Module 201 on computer (E) then downloads any new or modified files from the Web Server on computer (B). Modified files that are downloaded replace files that were originally uploaded in during initialization.

In embodiments of the invention, upload processes can be configured to break large files into smaller pieces to increase the likelihood of successful transmission over a poor or intermittent network connection. Parameters specify the largest such file piece (x) as well as a decrement value (y). In the event that transmitting a file piece of size (x) fails, retransmission occurs using a size of (x−y). A second successive failure would result in retransmission being attempted using a size of (x−2y). This continues until an acceptable file size is determined, or until the file piece size reaches 0 or less. Continued successive transmission failures result in continued attempts using the minimum file piece size value.

Download processes progressively accumulate a file across multiple attempts when using a poor or intermittent network connection. If the file size is (x) and only the (y) portion of the file has downloaded, the next attempt to download the file will directly request the last (x−y) portion of the file.

The end result is that the remote computer sends a file up through multiple tiers of a computer network infrastructure, an administrator modifies the uploaded file, and the remote computer downloads the modified file through those multiple tiers. Round-trip file routing and delivery are based on a unique automatically generated ID derived from the MAC ID(s) available within the remote device's network card(s). Poor or intermittent network connections cause only minor interference and result in minimal additional network traffic.

Figure 3:
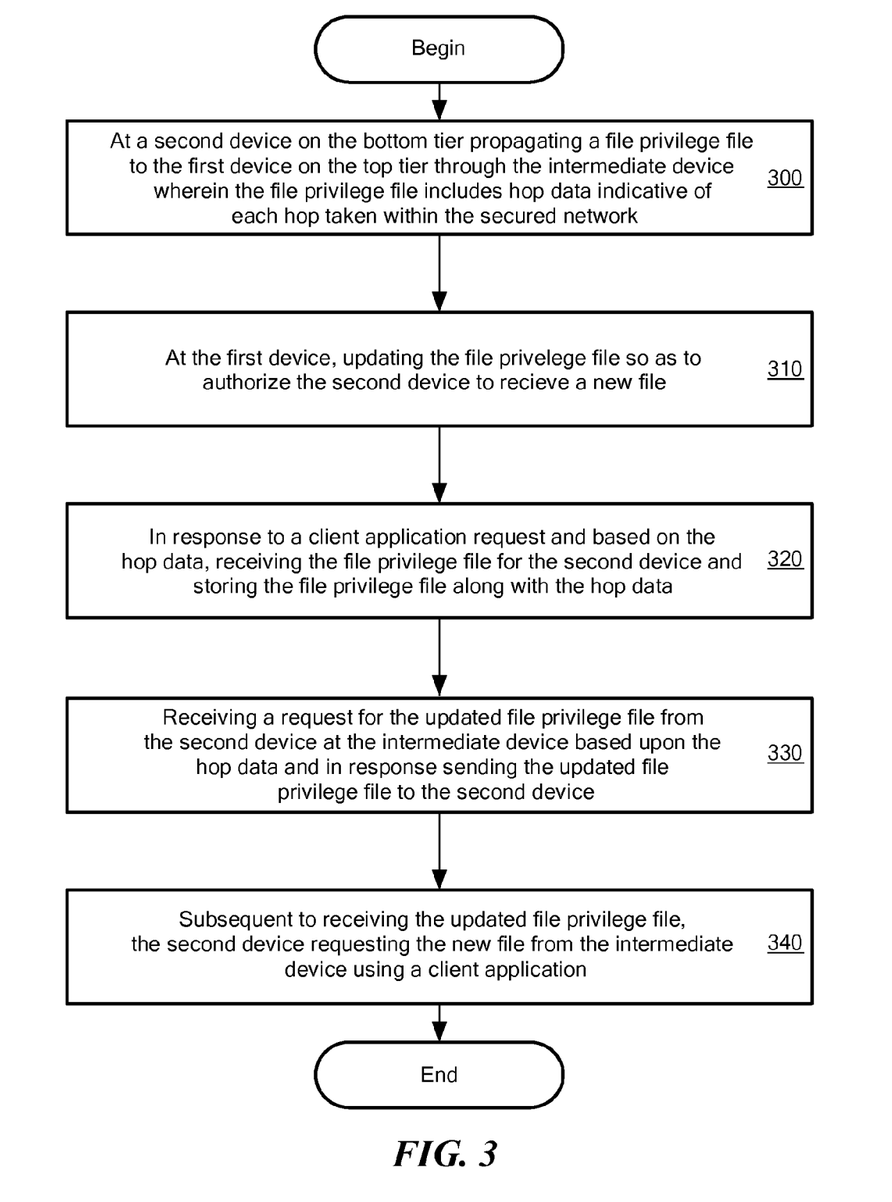
FIG. 3 is a flow chart of one embodiment of the invention in which the file privilege file originates on the bottom tier.
Figure 4:
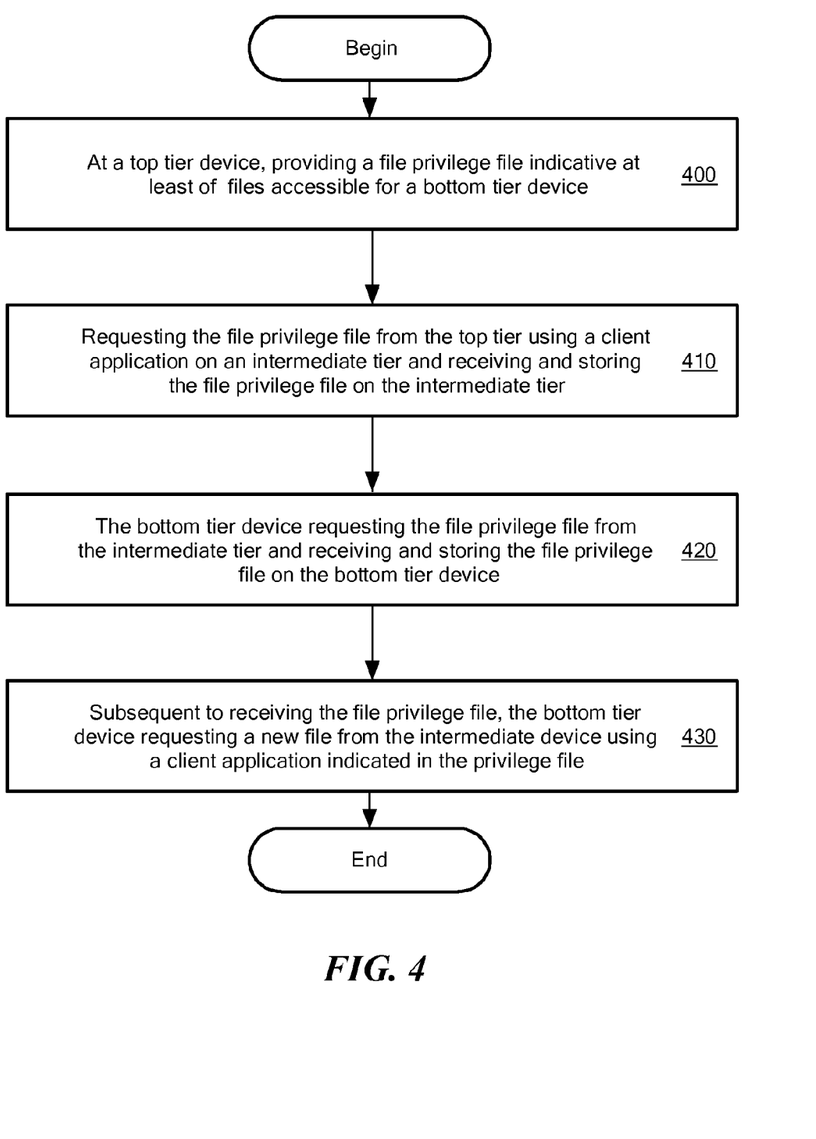
FIG. 4 is a flow chart of one embodiment of the invention in which the file privilege file originates on the top tier of the secured network.

FIGS. 3 and 4 show alternative points of origination for the file privilege file. In FIG. 3 the file privilege file originates at the bottom tier device and in FIG. 4 the file privilege file originates at the top tier.

FIG. 3 is a flow chart that expresses the processing of the file privilege file and the transfer of and updating of files between tiers in the secured network. The file privilege file originates on each bottom tier device when that bottom tier device is made part of the secured network. Upon establishment with the secured network, a client application module on the bottom tier device accesses the file privilege file that was placed on the device by a person with administrative rights. The file includes at least all of the files currently present on the computer that might be updated by the system administrator. Additionally, it may include a listing of files to be downloaded to the bottom tier device that are not yet on the computer. The file privilege file is transferred to an intermediate tier computer and the intermediate tier computer transfers the file to the top tier 300. Preferably, the client module of the web server on the intermediate tier makes a request to the bottom tier for the file privilege file. Similarly, a client module on the top tier will request the file privilege file from the intermediate tier. In such an embodiment, the client module on each tier is configured to request the file privilege files of any computer that is at a lower tier. In other embodiments, the file privilege file may be pushed by the client module to a server module on a next higher tier. In such a configuration, the server module is authorized to receive the file privilege file from a lower tier client module.

The top tier adds the information from the bottom tier device's file privilege file to its database of computers within the secured network and additionally notes which files the bottom tier device should have access to. Thus, an administrator can access this file and update the information 310. For instance, the administrator may add additional files to updated file privilege file for the bottom tier device. The updated file privilege file can then be propagated down to the bottom tier device. In addition to the file privilege file, each tier adds an identifier, such as its MAC address, so that each hop within the secured network can be tracked.

At a predetermined time, a client application on a computer within the intermediate tier requests the updated file privilege file from the top tier. 320. The intermediate tier receives the file privileged file along with the hop data. Thus, the hop data indicates that this file privilege file is for a bottom tier device. For example, the hop data may indicate that the file privilege file originated at the bottom tier was transferred to the intermediate tier and on to the top tier, and is now being propagated to the intermediate tier. A request for the updated file privilege file is then received from the second device on the bottom tier at the intermediate device at the intermediate tier based upon the hop data and in response sending the updated file privilege file to the second device. The updated file privilege file is then stored on the second device on the bottom tier. 330. Subsequent to receiving the updated file privilege file, the second device requests the new file from the intermediate device using the client application on the second device. 340. Thus, the new file will trickle down from the top tier to the intermediate tier and once it is stored on the intermediate tier, the second device on the bottom tier will request the new file and will store the new file to memory associated with the second device. Thus, a user of the second device, i.e. a laptop in the field, will have access to this new file.

It should be recognized that the client application will routinely query the next highest tier for updated files. When looking for updated files, the client application will use the latest received file privilege file for querying the next highest tier for a new version of the file. It should also be understood that any type of file may be identified by the file privilege file including, but not limited to configuration files, applications, and media. In embodiments, such as those discussed with respect to FIG. 3, the file privilege file is with respect to a specific computer.

FIG. 4 is a flow chart of the process of sending a file privilege file from the top tier down to the bottom tier. In this embodiment, the file privilege file is global and contains information regarding files for various devices within the network. First at the top tier, the file privilege file is provided for access by another tier 400. The intermediate tier access the file privilege file from the top tier using a client application and receives and stores the file when the server on the top tier sends the file privilege file to the intermediate tier 410. At a subsequent point in time, the bottom tier device request the file privilege file from the intermediate tier using a client program 420. The intermediate tier responds by having its web server send the file privilege file to the bottom tier and the bottom tier stores this file. Based upon the file privilege file, the bottom tier device requests any new files or modified files that are indicated in the file privilege file for the bottom tier device 430. This is done with the client application requesting the files from the web server (server application) on the intermediate tier device.

The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a secured network, such as a Government network, wherein the network is under the control of a single entity. For example, a secure network may include firewalls and other blocking devices and filters to avoid unwanted traffic. The secured network may contain open ports for normal Internet related traffic, such as ports 80 and 443. The methodology may be embodied as computer code on a tangible computer readable storage medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

What is claimed is:

1. A method of distributing content files maintained on a first device in a secured network, the secured network including at least the first device, an intermediate device, and a second device, each device being located at a different tier of the secured network, the method comprising:
    at the second device, receiving a file privilege file maintained on the first device via a connection in the secured network, wherein the file privilege file includes distribution information for the file privilege file and content files to be distributed in the secured network, including a list of at least an intermediate device and second device to receive the file privilege file;
    at the second device, receiving a content file based on the file privilege file using a stateless protocol via a connection in the secured network;
    at the first device, modifying the file privilege file with distribution information for at least a modified content file to produce an updated file privilege file;
    at the intermediate device, requesting transmission of the updated file privilege file from a server module on the first device by a client module on the intermediate device using a stateless protocol via a connection in the secured network;
    at the first device, transferring the updated file privilege file, via the server module on the first device, to the intermediate device in response to the request by the intermediate device using a stateless protocol via a connection in the secured network;
    at the second device, requesting transmission of the updated file privilege file from a server module on the intermediate device by a client module on the second device using a stateless protocol via a connection in the secured network;
    at the intermediate device, transferring the updated file privilege file from the intermediate device, via the server module on the intermediate device, to the second device in response to the request by the second device; and
    at the second device receiving the modified content file based on the updated file privilege file using a stateless protocol via a connection in the secured network.

2. The method according to claim 1 wherein the file privilege file is transferred between devices using an unsecured application layer protocol and a secured transport layer protocol.

3. The method according to claim 1 wherein the file privilege file provides information regarding security level of the device and content files that the device may receive.

4. The method according to claim 1, wherein the file privilege file includes configuration parameters for the second device.

5. A method according to claim 1 further comprising:
    at the second device propagating the file privilege file to the first device through the intermediate device wherein the file privilege file includes hop data indicative of at least the origination of the file privilege file within the secured network;
    at the first device, updating the file privilege file so as to authorize the second device to receive a new file;
    in response to a client application request on the intermediate device and based on the hop data, receiving the updated file privilege file for the second device and storing the updated file privilege file along with the hop data;
    receiving a request for the updated file privilege file from the second device at the intermediate device based upon the hop data and in response sending the updated file privilege file to the second device; and
    subsequent to receiving the updated file privilege file, the second device requesting the new file from the intermediate device using a client application based upon the file privilege file.

6. The method according to claim 5, wherein the file privilege file is updated at the first device based upon the origination of the file privilege file.

7. The method according to claim 6, wherein the hop data include data indicative of each device transmitting the file privilege file.

8. The method according to claim 5, wherein subsequent to the intermediate device receiving the updated file privilege file, the intermediate device requesting the new file from the first device using a client application.

9. The method according to claim 5, wherein the file privilege file is an individual file privilege file for the second device.

10. The method according to claim 5, wherein the first, intermediate, and second device reside on a different network tier wherein there may be more than one device on at least the tier for the intermediate device and the tier for the second device.

11. A computer program product including a non-transient computer readable medium with computer code thereon for a client module for updating a content file between a first network device and a second network device within a secured network without needing to change security parameters of the secured network, the first network device being in a top tier and the second network device being in a lower tier, the computer code comprising:
    computer code for uploading a file privilege file associated with the first network device from memory to a server component on the second network device, wherein the file privilege file includes distribution information for the file privilege file and content files to be distributed in the secured network, including a list of at least the second network device to receive the file privilege file and a list of content files accessible by the first network device;

computer code for requesting a modified file privilege file from a web server on the second network device using a stateless protocol; and computer code for downloading an updated version of the content file from the web server on the second device if the content file has been modified by comparing the content file stored in memory with the list of content files from the modified file privilege file.

12. A computer program product according to claim 11 further comprising:

computer code for assigning a unique identifier for the first network device;

computer code for providing the unique identifier for the first network device with the file when uploading the file from memory to the server component on the second network device.

13. A computer program product according to claim 12 wherein the unique identifier is initially assigned to the first network device and provided to the second network device prior to the file privilege file being requested from the web server on the second network device and wherein the file privilege file references the first network device by its unique identifier.

14. A computer program product according to claim 11 further comprising:

computer code for initiating an upload of the file privilege file from memory to the server component on the second network device if the file privilege file has been modified, wherein the initiation of the upload occurs at a regularly scheduled time.

15. A computer program product according to claim 14 wherein the computer code for initiating an upload further comprises sending a specified folder path to the second network device that includes a unique identifier for the first network device.

16. A computer program product according to claim 11 wherein the file privilege file contains a folder path indicative at least each network device that has received or transferred the file.

17. A computer program product on a non-transient computer-readable medium having computer code thereon for a server module for updating a content file among devices within a secured network without needing to change security parameters of the secured network, the computer code comprising:

computer code for receiving first security data from a device to access a list of available content files on the server module;

computer code for confirming that the device is authorized to access the listing of available content files on the server module;

computer code for modifying the first security data to produce second security data and providing the second security data to the device, wherein the first and second security data includes (i) a listing of available content files on the server module and devices to receive the listing, and (ii) information regarding access rights of the content files by other tier devices within the secured network; and computer code for receiving a request, from the device, to transfer thereto at least one of the content files in the listing of available files.

18. A computer program product according to claim 17, wherein the listing of available content files is a subset of all content files available on the server module and the listing of available content files is constrained by the first security data.

19. A computer program product according to claim 17, wherein the listing of available content files is part of a file privilege file that contains hop data for the file privilege file.

* * * * *

UNITED STATES PATENT AND TRADEMARK OFFICE
CERTIFICATE OF CORRECTION

PATENT NO. : 8,739,300 B2
APPLICATION NO. : 12/982232
DATED : May 27, 2014
INVENTOR(S) : Krajna et al.

It is certified that error appears in the above-identified patent and that said Letters Patent is hereby corrected as shown below:

In the Claims

Column 16, line 3, Claim 1
Replace "second device receiving"
With "second device, receiving"

Column 18, line 3, Claim 16
Replace "at least"
With "of at least"

Signed and Sealed this
Eighteenth Day of November, 2014

Michelle K. Lee
*Deputy Director of the United States Patent and Trademark Office*